Figure 9:
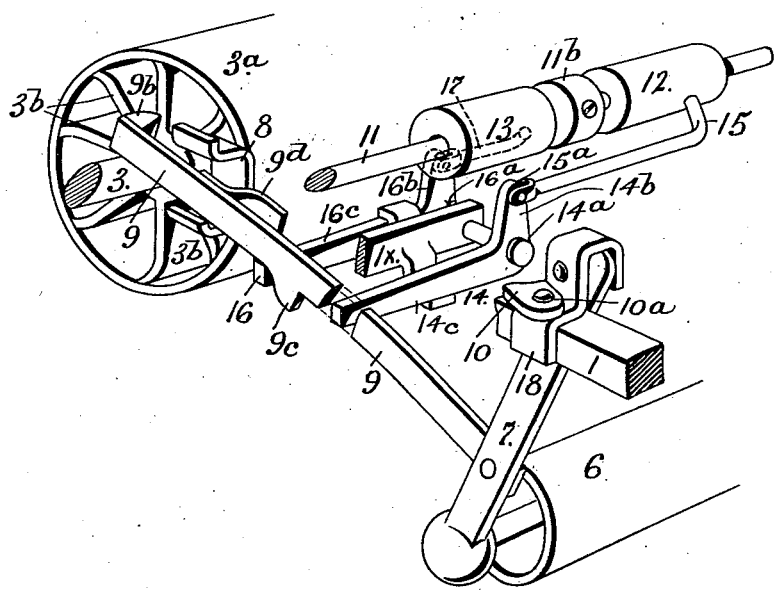

E. A. OSGOOD.
BELT GOVERNING MECHANISM.
APPLICATION FILED MAY 19, 1908.
921,621.
Patented May 11, 1909.
3 SHEETS—SHEET 1.
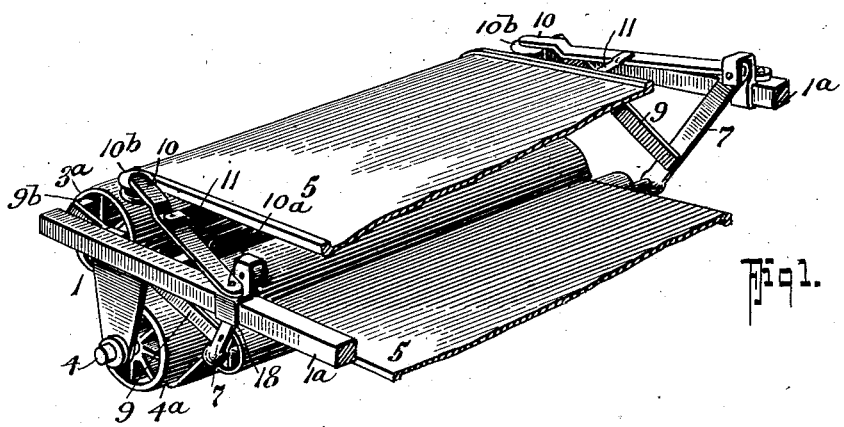
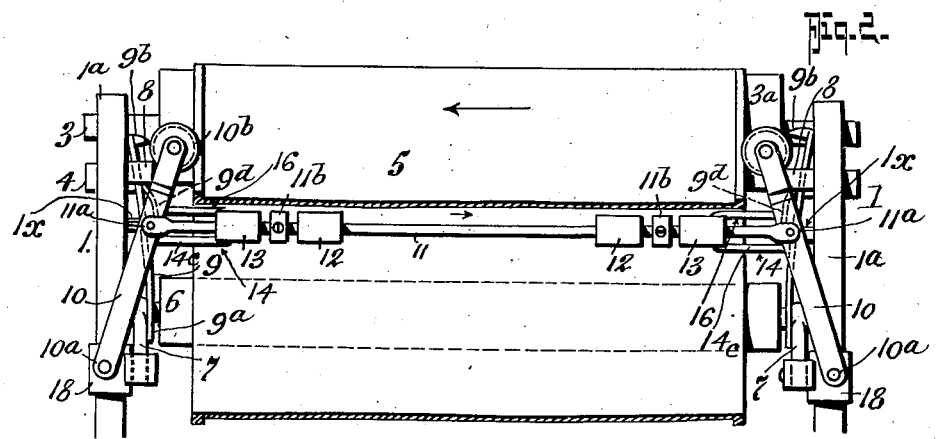
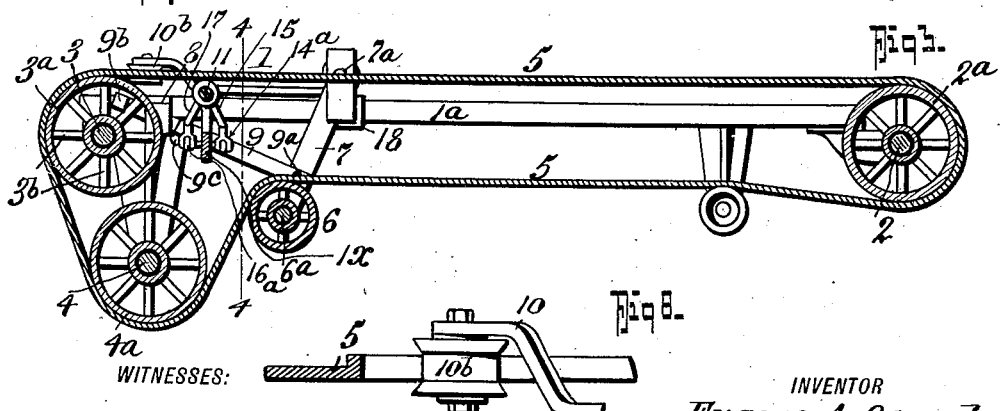
WITNESSES:
John T. Schrott
Charles H. Wagner
INVENTOR
Eugene A. Osgood.
BY
Fred G. Dieterich & Co
ATTORNEYS.

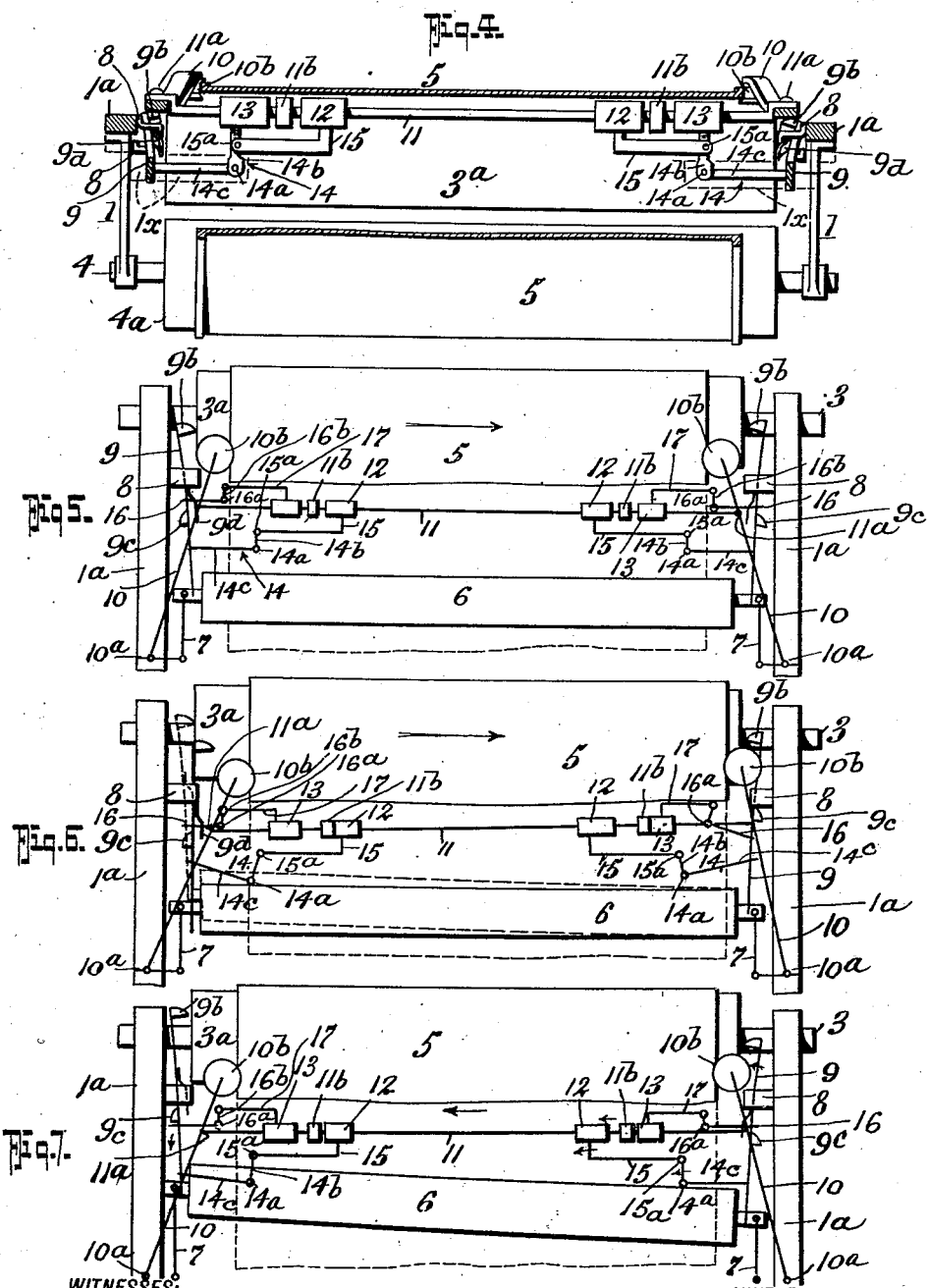

E. A. OSGOOD.
BELT GOVERNING MECHANISM.
APPLICATION FILED MAY 19, 1908.

921,621.

Patented May 11, 1909.
3 SHEETS—SHEET 3.

UNITED STATES PATENT OFFICE.

EUGENE A. OSGOOD, OF GARFIELD, UTAH, ASSIGNOR OF ONE-HALF TO JOSEPH A. KAUFFMAN, OF TOOELE, UTAH.

BELT-GOVERNING MECHANISM.

No. 921,621.  Specification of Letters Patent.  Patented May 11, 1909.

Application filed May 19, 1908. Serial No. 433,718.

*To all whom it may concern:*

Be it known that I, EUGENE A. OSGOOD, residing at Garfield, in the county of Salt Lake and State of Utah, have invented certain new and useful Improvements in Belt-Governing Mechanism, of which the following is a specification.

My invention relates to certain new and useful improvements in belt governing mechanism for use in continuous belt ore concentrators and the like and in its generic nature the invention embodies means for keeping the belt in proper position on the pulleys and prevent endwise creeping of the belt on the pulleys.

More specifically my invention comprises idler pulleys coöperating with the belt, and a means controlled by the endwise creeping of the belt for bringing the idler pulleys into play to change the tension on one side or the other of the belt, and cause it to creep back to its normal position, and means for automatically returning the idler pulleys to their normal position after the belt has reassumed its normal position.

In its more subordinate nature the invention embodies those novel details of construction, combination and arrangement of parts, all of which will be first described and then specifically pointed out in the appended claims, reference being had to the accompanying drawings, in which:—

Figure 1, is a perspective view of an endless belt concentrator embodying my invention. Fig. 2, is a top plan view of the parts shown in Fig. 1. Fig. 3, is a central, vertical longitudinal section of the parts shown in Fig. 2. Fig. 4, is a cross section on the line 4—4 of Fig. 3. Fig. 5, is a diagrammatic view illustrating the normal position of parts. Fig. 6, is a similar view illustrating the position of parts when the belt has crept to one side in the direction of the arrow and the pulley engaging arm has been released to come into engagement with the pulley. Fig. 7, is a similar view showing the position of parts after the idler pulley arm has engaged the pulley spoke and been drawn to its locked position. Fig. 8, is a detail view of the belt engaging pulley. Fig. 9 is a detail perspective view of a portion of my invention.

Referring now to the accompanying drawings in which like letters and numerals of reference indicate like parts in all of the figures, 1 designates the concentrator which consists of the frame $1^a$ which supports the axles 2, 3 and 4, of the main pulleys $2^a$, $3^a$ and $4^a$ respectively over which the belt 5 passes, the belt 5 also passing over an idler pulley 6 which is mounted on a shaft $6^a$ supported in hangers 7 that are fulcrumed at $7^a$ on brackets 18 secured to the frame at each side of the machine so that the belt 5 will pass thereover, as shown in the drawings.

8 designates a strap secured to the frame $1^a$ through which the arm 9 projects, the arm 9 being connected at $9^a$ to the hanger 7 and the arm 9, at its front end carries a hook $9^b$ that is adapted to hook into the spokes $3^b$ of the pulley $3^a$, at times. On its under face the arm 9 carries a stop $9^c$ for a purpose which will be presently explained, and on the side opposite to the frame $1^a$ the arm 9 carries a leaf-spring member $9^d$ that is adapted to slide into the loop 8 and force the arm away from the pulley and release the hook $9^b$ from the spoke at times, in a manner which will be hereinafter more fully explained.

10 designates arms which are fulcrumed at $10^a$ to the brackets 18, to swing horizontally, the arms 10 carrying grooved wheels $10^b$ at their ends to engage the edges of the belt 5 on either side thereof, there being two arms 10 arranged one on each side of the machine, and these arms 10 are joined by a transverse rod 11 which is pivoted at $11^a$ to the arms 10 and carries fixed stops $11^b$ on either side of which the movable collars 12 and 13 are mounted.

14 designates a bell crank lever fulcrumed at $14^a$ on a fixed portion $1^x$ of the frame, one arm $14^b$ of which is pivotally connected at $15^a$ with a rod 15 that is joined with the collar 12 so that as the collar 12 moves laterally, the arm $14^c$ of the bell crank lever will be moved in a vertical plane. Normally the arm $14^c$ of the bell crank lever 14 has its end abutting the arm 9 so as to hold its hook $9^b$ away from alinement with the spokes $3^b$ of the pulley $3^a$, as shown in the diagrammatic Figs. 5, 6 and 7 of the drawings. 16 designates another bell crank lever fulcrumed at $16^a$ to a fixed support and having its arms $16^b$ connected through a rod 17 with the collar 13 so that as the collar 13 is shifted laterally in one direction the arm $16^b$ of the bell crank lever will be dropped from contact with the under side of the arm 9 to move clear of the path of movement of the stop 9ᶜ of such arm 9 for a purpose which will be presently explained. It should be understood that there are duplicate levers 9, one on each side of the machine and the corresponding parts attached thereto are also duplicated, one on each side of the frame.

So far as described, the manner in which my invention operates will be best explained as follows:—Assume the parts to be in the position shown in Figs. 2 and 5, with the belt in central alinement, now supposing the belt starts to creep toward the right of Fig. 2, this will carry with it the rollers 10ᵇ and hence the arms 10 will be moved with the same, thus carrying the rod 11 in the direction of the arrow in Fig. 2, causing the fixed stop 11ᵇ to engage the collar 12 at the left of Fig. 2, and move the same in the same direction as the belt is creeping,—namely, toward the right in Fig. 2, thus causing the bell crank lever to be moved on its pivot to bring its arm 14ᶜ out of alinement with the arm 9, as shown in Fig. 6, and permit the arm 9 to move with its end 9ᵇ into engagement with the spokes 3ᵇ of the pulley 2ᵃ. The arms 9 are formed of resilient material and normally tend to move in engagement with the spokes. As soon as the hook 9ᵇ hooks into a spoke the arm 9 will be moved longitudinally and hence draw the corresponding end of the pulley 6 upwardly, thus changing the tension on that side of the belt. As soon as the arm 9 has been moved longitudinally a sufficient distance to cause the spring 9ᵈ to enter the loop or bracket 8, the same will release the hook 9ᵇ from the spoke. In the meantime the stop 9ᶜ will have passed over the arm 16ᵇ of the bell crank lever 16, and such lever will hold the arm 9 in such position. The arm 9 remains in the position stated until the belt has crept back to its normal position when the stop 11ᵇ will engage the collar 13 and move it laterally to rock the bell crank lever 16 out of alinement with the stop 9ᶜ and permit the parts to return to their normal position, it being understood that the same operation takes place in the other side of the machine when the belt creeps in an opposite direction to the arrow in Fig. 2.

Suitable springs may be provided wherever found necessary to hold the parts in their normal positions and it is to be understood that the distance between each set of collars 12 and 13 may be either greater or less than shown in the drawings, but by making the distance relatively slight the machine will operate to shift the belt into its normal position after it has crept only a slight distance out of alinement and by spacing the collars 12 and 13 farther apart the belt may be allowed to creep farther as may be found desirable.

After the member 11ᵇ disengages the member 12 to move toward the member 13, the lever 14ᶜ by its own weight, will turn to the position shown in Fig. 9. This is also aided by the frictional contact between the member 12 and shaft 11, likewise the frictional contact between the member 13 and shaft 11 will return the lever 16 to the position shown in Fig. 9, when the member 11ᵇ moves toward the member 12, or suitable springs may be provided to aid the action of gravity and friction in any well known manner.

What I claim is:

1. The combination with the endless belt and the main pulleys over which it passes, one of said pulleys having spokes, an idler pulley over which said belt passes, a support for said idler pulley, means connected with said support and adapted to engage the spokes of said main pulley to change the relative position of the idler pulley at times.

2. The combination with the endless belt and the main pulleys over which it passes, one of said pulleys having spokes, an idler pulley over which said belt passes, a support for said idler pulley, means connected with said support and adapted to engage the spokes of said main pulley to change the relative position of the idler pulley at times, and means for releasing said spoke engaging means at other times.

3. The combination with the belt and the main pulley over which it passes, said main pulley having spokes, of an idler pulley over which said belt passes, a support for said idler pulley, means connected with said support and normally tending to engage with the spokes of said main pulley for shifting the position of the idler pulley, means for normally holding said spoke engaging means out of engagement with the spoke and means controlled by the lateral movement of the belt for releasing said last named means to permit the spoke engaging means to engage the spoke.

4. The combination with the belt and the main pulley over which it passes, said main pulley having spokes, of an idler pulley over which said belt passes, a support for said idler pulley, means connected with said support and normally tending to engage with the spokes of said main pulley for shifting the position of the idler pulley, means for normally holding said spoke engaging means out of engagement with the spoke, means controlled by the lateral movement of the belt for releasing said last named means to permit the spoke engaging means to engage the spoke, and another means for locking said spoke engaging means in one position, and means also controlled by the lateral movement of the belt for releasing said locking means to permit the idler pulley to resume its normal position.

5. The combination with the belt and the main pulley, having spokes, over which the belt passes, of a pivoted hanger, an idler pulley carried thereby over which the belt passes, an arm connected with said hanger and having a hook portion tending to normally engage the spokes of said main pulley, a guide bracket for said arm, means for normally holding said arm out of engagement with the pulley spokes, belt controlled means for releasing said last named means to permit the arm to engage the pulley spokes at times.

6. The combination with the belt and the main pulley having spokes over which the belt passes, of a pivoted hanger, an idler pulley carried thereby over which the belt passes, an arm connected with said hanger and having a hook portion tending to normally engage the spokes of said main pulley, a guide bracket for said arm, means for normally holding said arm out of engagement with the pulley spokes, belt controlled means for releasing said last named means to permit the arm to engage the pulley spokes at times, and means carried by the arm for disengaging it from the spokes at times.

7. The combination with the belt and the main pulley having spokes over which the belt passes, of a pivoted hanger, an idler pulley carried thereby over which the belt passes, an arm connected with said hanger and having a hook portion, tending to normally engage the spokes of said main pulley, a guide bracket for said arm, means for normally holding said arm out of engagement with the pulley spokes, belt controlled means for releasing said last named means to permit the arm to engage the pulley spokes at times, means carried by the arm for disengaging it from the spokes at times, and another means for locking said arm after it is disengaged from the spokes.

8. The combination with the belt and the main pulley having spokes over which the belt passes, of a pivoted hanger, an idler pulley carried thereby over which the belt passes, an arm connected with said hanger and having a hook portion tending to normally engage the spokes of said main pulley, a guide bracket for said arm, means for normally holding said arm out of engagement with the pulley spokes, belt controlled means for releasing said last named means to permit the arm to engage the pulley spokes at times, means carried by the arm for disengaging it from the spokes at times, another means for locking said arm after it is disengaged from the spokes, and belt controlled means for releasing said locking means at other times to permit said idler pulley and its hanger to assume its normal position.

EUGENE A. OSGOOD.

Witnesses:
OSCAR SEMLEY,
J. H. CASH.